Nov. 26, 1940. J. E. SMITH 2,222,883
ELECTRICAL HEATING UNIT
Filed April 29, 1938
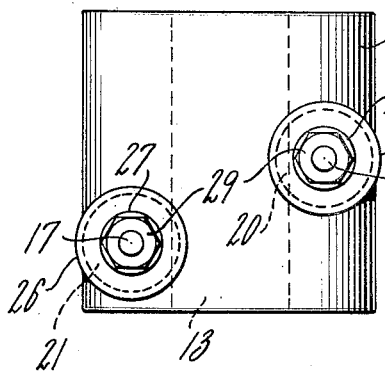
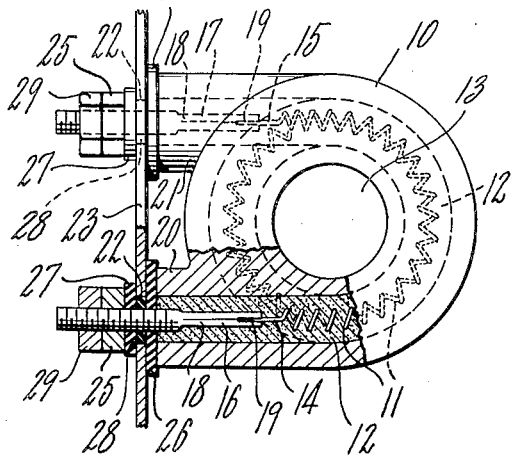
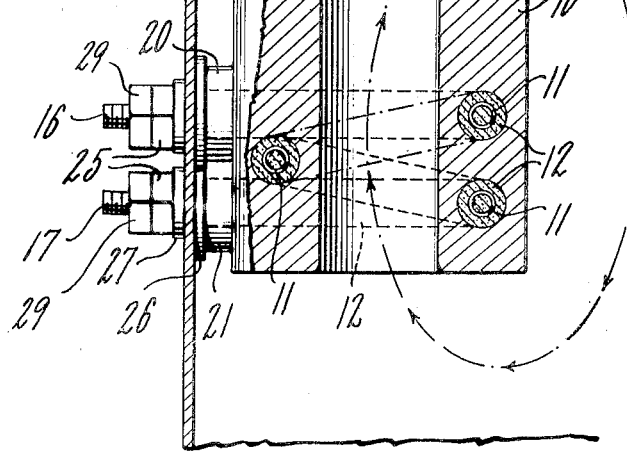
INVENTOR.
JOHN ERNEST SMITH
BY
ATTORNEY.

Patented Nov. 26, 1940

2,222,883

UNITED STATES PATENT OFFICE 2,222,883

ELECTRICAL HEATING UNIT

John E. Smith, Plainfield, N. J.

Application April 29, 1938, Serial No. 205,048

5 Claims. (Cl. 219—44)

My invention relates to electrical heating units of the immersion type adapted for installation in the interior of tanks, various kinds of heating vessels or other similar devices containing a liquid to be heated.

One of the features of my invention is the provision of a heating unit adapted for easy installation, requiring only a small amount of labor, and in which all electrical connections to the source of current are made on the outside of the heating device in which the unit is installed.

Another important feature is the provision of a heating unit arranged to promote rapid circulation, whereby the entire liquid contents of the container is more quickly brought to the required temperature, stratification prevented, and the need for independent circulating means eliminated.

This heating unit also embodies features of improvement contributing to rapid transfer of heat from an electrical heating element embedded in a metallic body of the unit to the liquid contents of the heating device.

Various other features and advantages of my invention will appear as the description proceeds, reference being made to the accompanying drawing in which:

Fig. 1 is a view of the outside of a heating unit embodying my invention,

Fig. 2 a plan view of the unit installed in the wall of a heating vessel, portions being broken away in section, and, Fig. 3 is a vertical section of the unit illustrated in Fig. 2, also with portions broken away in section.

In the drawing the reference numeral 10 indicates a housing preferably of cast metal such as aluminum in the body of which there is located a wire resistance comprising a heating element 11. The element 11 is embedded in a suitable heat resisting insulating substance such as ceramic material 12, and is arranged in spiral formation around a vertically disposed opening 13 in the body of the housing 10. The ends 14 and 15 of the heating element 11 are secured respectively to threaded terminals or pins 16 and 17 in any desired way to insure good electrical connections at these points. In the present example the pins 16 and 17 are squared at 18 to prevent turning in the insulating material 12, and are slit as indicated at 19 for receiving the ends of the heating element, the sides of the studs adjacent the slits being pressed in against the wire to form secure connections.

The housing 10 is provided with mounting legs 20 and 21 through which the threaded pins 16 and 17 extend. The studs project outward from the ends of the legs 20 and 21 and extend through suitable openings 22 in the vertical wall 23 of the heating vessel 24. Nuts 25 threaded onto the studs draw the ends of the mounting legs 20 and 21 against interior washers 26, there being provided an insulating washer 27 between each of the nuts 25 and the outer surface of the vessel wall 23, and suitable insulation 28 in the openings 22 around the studs.

Electrical conductors from a source current are to be secured to the pins 16 and 17 by clamping between the nuts 25 and 29 as will be readily understood.

In manufacturing foregoing unit, the heating element and its ceramic covering are suitably held in a mold and the metal of the housing poured into mold around the embedded element. During the process of cooling the shrinking metal creates exceeding pressure against the enclosed embedding material surrounding the heating element. The parts are thereby compacted and the metal of the housing is brought into intimate contact with the insulating material under pressure. This reduces thermal resistance and consequently enables heat generated in the element 11 to be more rapidly transmitted to and through the body of the housing and into the liquid contents to be heated. Furthermore, it enables the heating element to be worked at a very high wattage per unit area of heating surface and therefore permits the device to be operated at high efficiency.

The opening 13 produces a column of heated fluid which rises upward causing circulation of the fluid as diagrammatically illustrated by the arrows in Figure 3, whereby the fluid is given a thorough intermixing and motion resulting in quick and uniform heating of the entire contents of the vessel.

The unit may be employed for heating various kinds of liquids, either heavy or light. In the case of heavy liquids it may be desirable to enlarge the heating surface by increasing the diameter and/or length of the opening 13 by suitable alterations in the construction of the housing.

Various other modifications and alterations may be made in the above noted construction without departing from the invention as defined in the appended claims.

I claim:

1. A heating unit of the immersion type comprising a tubular housing, an electric heating element surrounding the opening through the housing, and terminal posts connected to the ends of the heating element, extending outside the housing and through a wall of the housing, the housing being rigidly supported thereby in a vessel.

2. A heating unit of the immersion type comprising a cylindrical housing having an opening therethrough, an electric heating element embedded in the material of the housing around said opening, terminal posts extending outside of the housing and connected to the ends of the heating element, mounting legs on said housing and surrounding said posts, the latter extending through openings in the wall of a heating vessel, and means cooperating with said terminals for holding the legs rigidly against said wall.

3. A heating unit of the immersion type comprising a housing having an opening therethrough, an electric heating element embedded in insulating material within the body of the housing and surrounding said opening, terminal pins projecting into said insulating material and connected to the ends of the heating element, mounting legs carried by the housing around the terminal pins, the latter being adapted to project beyond the ends of said legs and through openings in the wall of a heating vessel, means cooperating with the projecting portions of said pins for holding the legs against said wall to support the unit in the vessel, and means for insulating said terminal pins from said wall.

4. A heating unit adapted for immersed operation in a heating vessel, comprising a tubular body, a heating element core therein consisting of coiled resistance wire embedded in ceramic insulating material of substantially greater diameter than that of said coil, said body being formed of metal having high thermal conductivity and cast around the heating element core.

5. A heating unit adapted for immersed operation in a heating vessel, comprising a tubular body, a heating element core therein consisting of coiled resistance wire embedded in ceramic insulating material of substantially greater diameter than that of said coil, a pair of terminal pins connected to said wire and extending outwardly from said core, the ceramic material extending over a portion of said pins, said body being formed of metal having high thermal conductivity and cast around the heating element core including the enclosed part of the projecting terminal pins.

JOHN E. SMITH.